US009134707B2

(12) United States Patent
Vamvoudakis et al.

(10) Patent No.: US 9,134,707 B2
(45) Date of Patent: Sep. 15, 2015

(54) OPTIMAL ONLINE ADAPTIVE CONTROLLER

(71) Applicant: Board of Regents, The University of Texas System, Austin, TX (US)

(72) Inventors: Kyriakos Vamvoudakis, Goleta, CA (US); Draguna L. Vrabie, Broad Brook, CT (US); Frank Lewis, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 59 days.

(21) Appl. No.: 13/715,116

(22) Filed: Dec. 14, 2012

(65) Prior Publication Data

US 2013/0262353 A1  Oct. 3, 2013

Related U.S. Application Data

(60) Provisional application No. 61/618,585, filed on Mar. 30, 2012.

(51) Int. Cl.
*G06N 3/04* (2006.01)
*G05B 13/02* (2006.01)
*G06N 5/04* (2006.01)
*G06N 99/00* (2010.01)
*G06N 5/02* (2006.01)

(52) U.S. Cl.
CPC *G05B 13/02* (2013.01); *G06N 3/04* (2013.01); *G06N 5/025* (2013.01); *G06N 5/041* (2013.01); *G06N 99/005* (2013.01)

(58) Field of Classification Search
None
See application file for complete search history.

(56) References Cited

PUBLICATIONS

Venayagamoorthy, et al., Comparison of Heuristic Dynamic Programming and Dual Heuristic Programming Adaptive Critics for Neurocontrol of a Turbogenerator, IEEE Transactions ON Neural Networks, vol. 13, No. 3, May 2002, pp. 764-773.*
Padhi, et al., A single network adaptive critic (SNAC) architecture for optimal control synthesis for a class of nonlinear systems, Neural Networks 19 (2006) pp. 1648-1660.*
M. Abu-Khalaf, F. L. Lewis, "Nearly Optimal Control Laws for Nonlinear Systems with Saturating Actuators Using a Neural Network HJB Approach", Automatica, vol. 41, No. 5, pp. 779-791, 2005.
L. C. Baird III, "Reinforcement Learning in Continuous Time: Advantage Updating", Proc. Of ICNN, Orlando FL, Jun. 1994.
R. Beard, G. Saridis, J. Wen, "Galerkin approximations of the generalized Hamilton—Jacobi—Bellman equation", Automatica, vol. 33, No. 12, pp. 2159-2177, 1997.

(Continued)

*Primary Examiner* — Wilbert L Starks
(74) *Attorney, Agent, or Firm* — Thomas | Horstemeyer, LLP

(57) ABSTRACT

Various embodiments are disclosed for optimal online adaptive control. One such method includes a cost function determination by a critic network coupled to the system under control. The cost function is one produces a minimum value for a cost of the system under control when applied by an action network. The method also includes a control input determination by an action network. The control input determination uses the cost function to determine a control input to apply to the system under control. The control input is one that produces the minimum value for the cost of the system under control. The method also includes simultaneously tuning respective parameters of the critic network and the action network by applying respective tuning laws that do not involve the system dynamics function f(x) for the system under test.

20 Claims, 3 Drawing Sheets

(56) References Cited

PUBLICATIONS

D. P. Bertsekas and J. N. Tsitsiklis, Neuro-Dynamic Programming, Athena Scientific, MA, 1996.

S. Bhasin, M. Johnson, W. E. Dixon, "A model free robust policy iteration algorithm for optimal control of nonlinear systems", Proc. 49th IEEE Conference on Decision and Control, pp. 3060-3065, Atlanta, 2010.

T. Dierks, S. Jagannathan, "Optimal Control of Affine Nonlinear Continuous-time systems Using an Online Hamilton-Jacobi-Isaacs Formulation", Proc. 49th IEEE Conference on Decision and Control, pp. 3048-3053, Atlanta, 2010.

T. Hanselmann, L. Noakes, and A. Zaknich, "Continuous-Time Adaptive Critics", IEEE Transactions on Neural Networks, 18(3), 631-647, 2007.

P. Werbos, "Neural networks for control and system identification", IEEE Proc. CDC89, IEEE, 1989.

D. Kleinman, "On an Iterative Technique for Riccati Equation Computations", IEEE Trans. on Automatic Control, vol. 13, pp. 114-115, Feb., 1968.

F.L. L Lewis, S. Jagannathan, A. Yesildirek, Neural Network Control of Robot Manipulators and Nonlinear Systems, Taylor & Francis 1999.

D. Vrabie, O. Pastravanu, F. Lewis, M. Abu-Khalaf, "Adaptive Optimal Control for Continuous-Time Linear Systems Based on Policy Iteration," Automatica, vol. 42, No. 2, pp. 477-484, 2009.

J. J. Murray, C. J. Cox, G. G. Lendaris, and R. Saeks, "Adaptive Dynamic Programming", IEEE Trans. On Systems, Man and Cybernetics, vol. 32, No. 2, pp. 140-153, 2002.

D. Prokhorov, D. Wunsch, "Adaptive critic designs," IEEE Trans. on Neural Networks, vol. 8, No. 5, pp. 997-1007, 1997.

Kyriakos G. Vamvoudakis, and F. L. Lewis, "Online Actor-Critic Algorithm to Solve the Continuous-Time Infinite Horizon Optimal Control Problem," Automatica, vol. 46, No. 5, pp. 878-888, 2010.

R. S. Sutton, A. G. Barto, Reinforcement Learning—An Introduction, MIT Press, Cambridge, Massachusetts, 1998.

\* cited by examiner

OPTIMAL ONLINE ADAPTIVE CONTROLLER

CROSS REFERENCE TO RELATED APPLICATIONS

This application claims the benefit of U.S. Provisional Application No. 61/618,585, entitled "Optimal Online Adaptive Controller," filed Mar. 30, 2012, which is hereby incorporated by reference in its entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Contract No. ECS-0801330 awarded by the National Science Foundation of the U.S.; by the terms of Contract No. ECCS-1128050 awarded to the Army Research Office; and by the terms of Contract No. FA9550-09-1-0278 awarded to the Air Force Office of Scientific Research.

BACKGROUND

Automatic feedback control is used in various fields such as: autopilots for aircraft, ships, and ground vehicles; industrial process control; factory automation; robotics; and other applications. In the context of this disclosure, "offline" means the controller parameters are pre-computed and stored. In contrast, "online" means the controller learns, and parameters are computed, as the system operates, e.g. as the aircraft flies. Computing and updating controller parameters using online solutions may allow for changing dynamics, for example, to handle the reduced weight of the aircraft as the fuel burns.

Conventional optimal feedback control design is performed offline by solving optimal design matrix equations. Furthermore, it is difficult to perform optimal feedback control designs for nonlinear systems since they rely on solutions to complicated Hamilton-Jacobi (HJ) or Hamilton-Jacobi-Isaacs (HJI) equations. A complete system dynamics model is needed to solve HJI equations, but such complete models are often difficult to obtain. Also, offline solutions do not allow performance objectives to be modified as the controller learns.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In accordance with some embodiments disclosed herein, online and adaptive techniques are disclosed that use integral reinforcement learning knowledge for learning the continuous-time optimal control solution for nonlinear systems. The nonlinear systems have infinite horizon costs. These techniques are a data-based approach to the solution of the Hamilton-Jacobi-Bellman (HJB) equation, and require only partial knowledge of the nonlinear system's dynamics.

The adaptive techniques disclosed herein are based on policy iteration. In accordance with some embodiments of the invention, the techniques are implemented using a dual network structure that includes an actor network and a critic network. In accordance with the preferred embodiments, both action and critic approximation networks are adapted simultaneously. Novel tuning equations are disclosed for both critic and action network parameters. In some embodiments, novel terms in the action tuning law are used to guarantee closed-loop dynamic stability.

In accordance with some embodiments disclosed herein, techniques and system are provided for continuous-time adaptive control systems. In comparison to discrete-time systems, continuous-time systems are more analogous for direct modeling of physical processes and dynamical systems.

In accordance with some embodiments disclosed herein, novel features include unified action-critic reinforcement learning with adaptive control; an action-critic control structure with simultaneous tuning of action and critic control loops for continuous-time (CT) systems; an adaptive control architecture that converges to an optimal control solution online in real time; an adaptive control architecture with an outer and inner adaptive loop, wherein the outer loop identifies a performance index value; for linear systems, an optimal adaptive controller that solves the algebraic Riccati equation online without knowing the plant system matrix A; for nonlinear systems, an optimal adaptive controller that approximately solves the Hamilton-Jacobi-Bellman (HJB) equation online without knowing the system drift dynamics; and the optimal adaptive controller learns the optimal solution online while also guaranteeing system stability.

Figure 1:
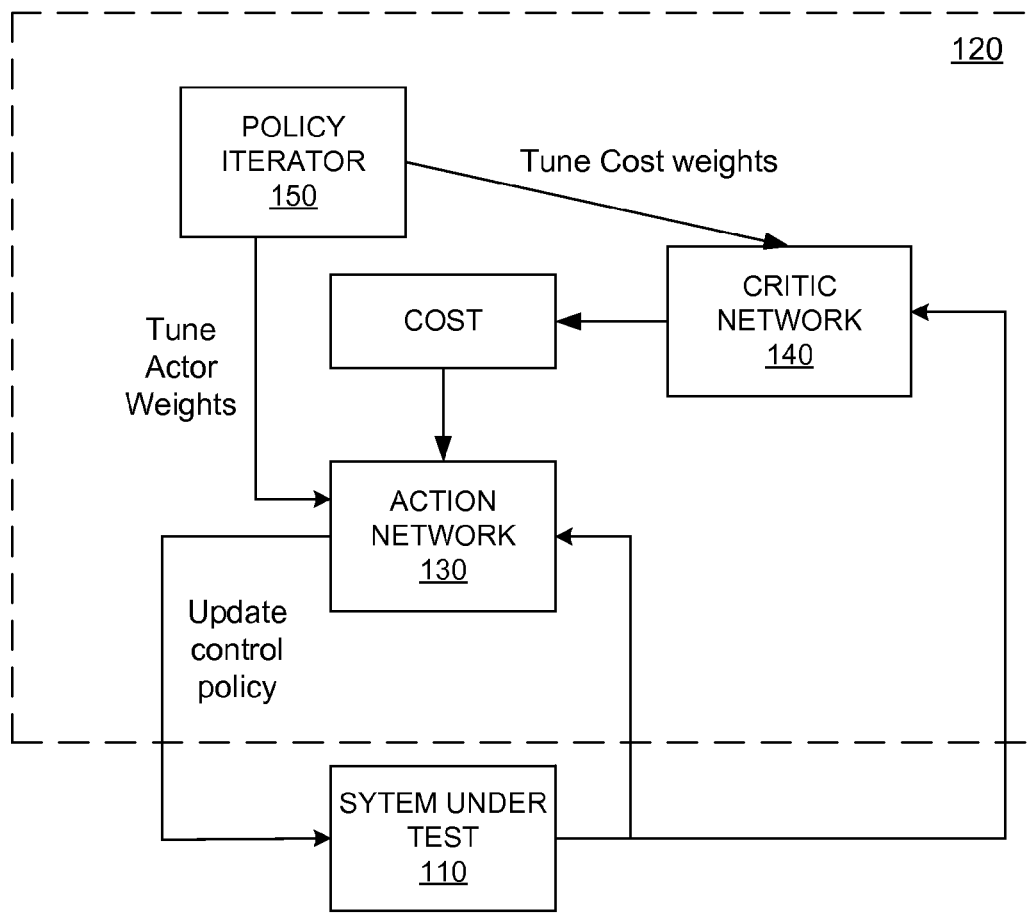
FIG. 1 is a block diagram of a system that includes an optimal online adaptive controller, according to some embodiments disclosed herein.

FIG. 1 is a block diagram of a system including an optimal online adaptive controller. A system under test 110, also known as a "plant," is a nonlinear dynamical system described by the differential equation (1) shown below:

$$\dot{x}(t) = f(x) + g(x)u \qquad (1)$$

where x(t) is the system state and u is a set of control inputs. For simplicity, sometimes u is referred to herein as a control input, in the singular, in which case u can be viewed as a composite input signal. Functions f(x) and g(x) describe the system dynamics, with function f(x) being referred to herein as the "drift term."

Functions f(x) and g(x) depend on the specific system being modeled, as should be appreciated. The functions f(x), g(x) and control inputs u may be used to describe specific systems such as:

Aircraft, where the states x(t) include the altitude, angle of attack, speed, and so on and the control inputs u are throttle, elevator, aileron, and so on.

Chemical processes, where the states x(t) include temperatures, fluid flows, and so on and the control inputs u are heater elements, valves, and so on.

Electric power systems, where the states x(t) include currents, voltages, power flow, and so on and the control inputs u are generator speeds, motor excitations and so on.

Automotive vehicles where the states x(t) include engine rotational speed, automobile speed, and so on and the control inputs u are throttle, fuel/air mixture, and so on.

Ships where the states x(t) include speed, heading, engine rotation speed, and so on and the control inputs u are fuel injected and other engine inputs, and ship inputs such as rudder angle.

The optimal online adaptive controller 120 determines the states x(t) of the system under test 110 by measuring various types of input and output data using sensors coupled to, or otherwise in communication with, the system under test 110. The optimal online adaptive controller 120 determines the control input u to achieve stability and desired motion of the system given in equation (1) and also to minimize an energy-based cost function as given in equation (2).

$$V(x_0) = \int_0^\infty r(x(\tau), u(\tau)) d\tau = \int_0^\infty (Q(x) + u^T Ru) d\tau \qquad (2)$$

In equation (2), the energy used by the control input u is $u^T Ru$ and the energy of the system states is $Q(x)$. The matrix R and the function $Q(x)$ can be selected by the engineer that designs optimal online adaptive controller to achieve a variety of goals such as minimizing control energy used, minimizing fuel, minimizing various forms of energy of the system states, and so on.

The optimal online adaptive controller 120 includes two learning systems or learning networks, action network 130 and critic network 140, that interact with each other. These networks may be implemented using artificial neural networks (ANNs). The action network 130 uses a control policy to determine the control input $u(x)$ that is applied to the system under test 110 and the critic network 140 estimates the associated cost function $V(x)$, which indicates the energy used by the system under test 110. In some embodiments disclosed herein, the action network 130 is an inner loop feedback controller and the critic network 140 is an outer loop feedback controller. Both are located in a feed forward path with respect to the system under test 110.

The action network 130 is characterized by equation (3):

$$u(x) = -\frac{1}{2} R^{-1} g^T(x) \nabla \phi^T \hat{W}_2 u(x) \qquad (3)$$

$$= -\frac{1}{2} R^{-1} g^T(x) \nabla \phi^T \hat{W}_2$$

where $\hat{W}_2$ are parameters that are learned or updated online.

The critic network 140 estimates the cost function given by equation (2): and may be characterized by equation (4):

$$V(x) = \hat{W}_1^T \phi(x) \qquad (4)$$

where $\hat{W}_1$ are parameters that are learned or updated online. In equations (3) and (4), $\phi(x)$ is a set of basis functions suitably chosen depending on the specifics of nonlinear dynamical system under test 110.

The parameters $\hat{W}_1$ of the critic network 140 and the parameters $\hat{W}_2$ of the action network 130 are updated, or tuned, online according to the update, or tuning, laws given by equations (5) and (6):

$$\dot{\hat{W}}_1 = \qquad (5)$$
$$-a_1 \frac{\Delta\phi(x(t))^T}{(1+\Delta\phi(x(t))^T \Delta\phi(x(t)))^2} \left[ \int_{t-T}^t (Q(x) + u^T Ru) d\tau + \Delta\phi(x(t))^T \hat{W}_1 \right]$$

$$\dot{\hat{W}}_2 = -a_2 (F_2 \hat{W}_2 - F_1 \Delta\phi(x(t))^T \hat{W}_1) - \qquad (6)$$
$$\frac{1}{4} a_2 \bar{D}_1(x) \hat{W}_2 \frac{\Delta\phi(x(t))^T}{(1+\Delta\phi(x(t))^T \Delta\phi(x(t)))^2} \hat{W}_1$$

In some embodiments, this updating performed is by a policy iterator 150. In some embodiments disclosed herein, the term $\Delta\phi(x(t)) = \phi(x(t+T)) - \phi(x(t))$ is computed in real time along the system motion.

The specific tuning laws used by the optimal online adaptive controller 120 allow the parameters $\hat{W}_1$ and $\hat{W}_2$ to converge to the optimal solution that minimizes the cost function given by equation (2). Specifically, the critic network 140 characterized by equation (4) learns the minimum possible value of the energy cost given by equation (2), while the action network 130 characterized by equation (3) learns the optimal control that produces this best minimum value.

Notably, the tuning laws used by the optimal online adaptive controller 120 do not involve the system dynamics drift term f(x), which allows the optimal control to be learned online by the controller 120, using only a partial model of system dynamics. That is, only measured input/output data provided by sensors coupled to the system under test 110 is used by the optimal online adaptive controller 120 to find the optimal solution.

The use of a partial rather than complete model is accomplished by decomposing the cost function of equation (2) into two parts by writing it in the Integral Reinforcement Learning (IRL) form given by equation (7):

$$V(x(t)) = \int_t^{t+T} r(x, u) d\tau + V(x(t+T)) \qquad (7)$$

Equation (7) can be viewed as a Bellman equation for continuous-time (CT) systems, and is referred to herein as the IRL form of the Bellman equation. In contrast, the Bellman equation used by conventional policy iteration algorithms includes both f(x) and g(x) terms, and thus requires a full system dynamics model. Because of the additional complexity of the full model, controllers using conventional policy iteration algorithms must find the optimal solution offline.

Although the embodiments described above were described in the context of continuous-time (CT) systems, in some embodiments of the invention the optimal online adaptive controller 120 is used to control of discrete-time (DT) systems. Such DT systems have nonlinear dynamics in the form given by equation 8:

$$x_k = f(x_k) + g(x_k) u_k \qquad (8)$$

Equation 8 is for a sampled data nonlinear dynamical system based on a fixed sampling period. The sampled data nonlinear dynamical system can model the same types of physical systems as the continuous-time dynamic system described by equation (1).

Various embodiments of the optimal online adaptive controller 120 may have the following capabilities:

Guaranteed stability of the system given by equation (1). That is, the system states x(t) are guaranteed to be bounded near their desired values regardless of system disturbances.

Minimization of the cost function given by equation (2). That is, the control yields minimum energy motion that makes the expended energy costs small.

Online learning of the optimal minimizing solution, in real time, by measuring the system states x(t) and control inputs u. This is called adaptive learning in real time.

Online learning of the optimal solution without knowing the system dynamics function f(x).

Full proofs and guarantees on the correct performance of the controller including stability of the system characterized by equation (1) and optimality of the energy cost function given by equation (2).

Figure 2:
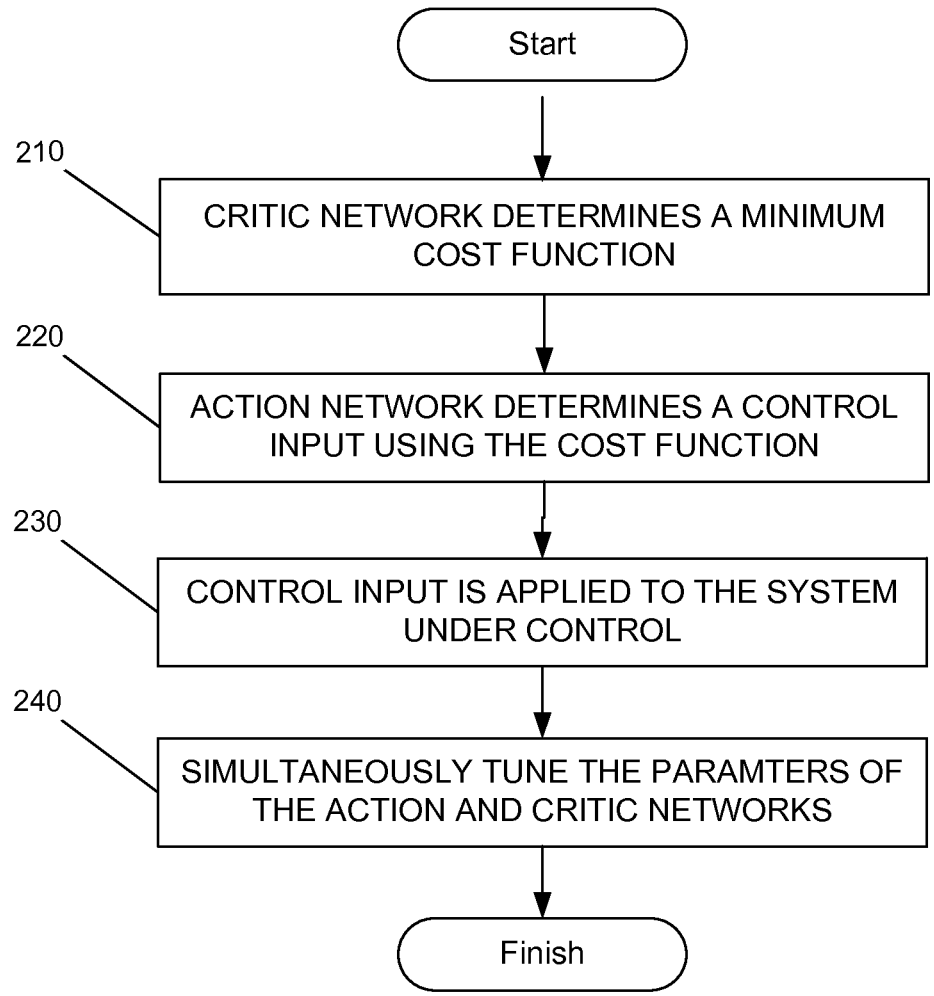
FIG. 2 is a flowchart illustrating operation of the optimal online adaptive controller of FIG. 1, according to some embodiments disclosed herein.

FIG. 2 is a flowchart illustrating operation of the optimal online adaptive controller 120, according to some embodiments disclosed herein. The process begins at block 210, where the critic network 140 determines the minimum cost to the system under test 110 when an output is applied to the system under test 110. Next, at block 220, the action network 130 uses the minimum cost computed at block 210 to determine a control input to the system under test 110. At block 230, the control input developed at 220 is applied to the system under test 110. At block 240, the policy iterator 150 simultaneously updates, or tunes, the $\hat{W}_1$ and $\hat{W}_2$ parameters of the action network 130 and the critic network 140. As described herein, the updated is performed in accordance with the tuning laws described by equations (5) and (6), which use the IRL form of the Bellman equation. The only data from the system under test 110 that is used by the tuning of block 240 is input/output data that is obtained by measuring the system under test 110.

Figure 3:
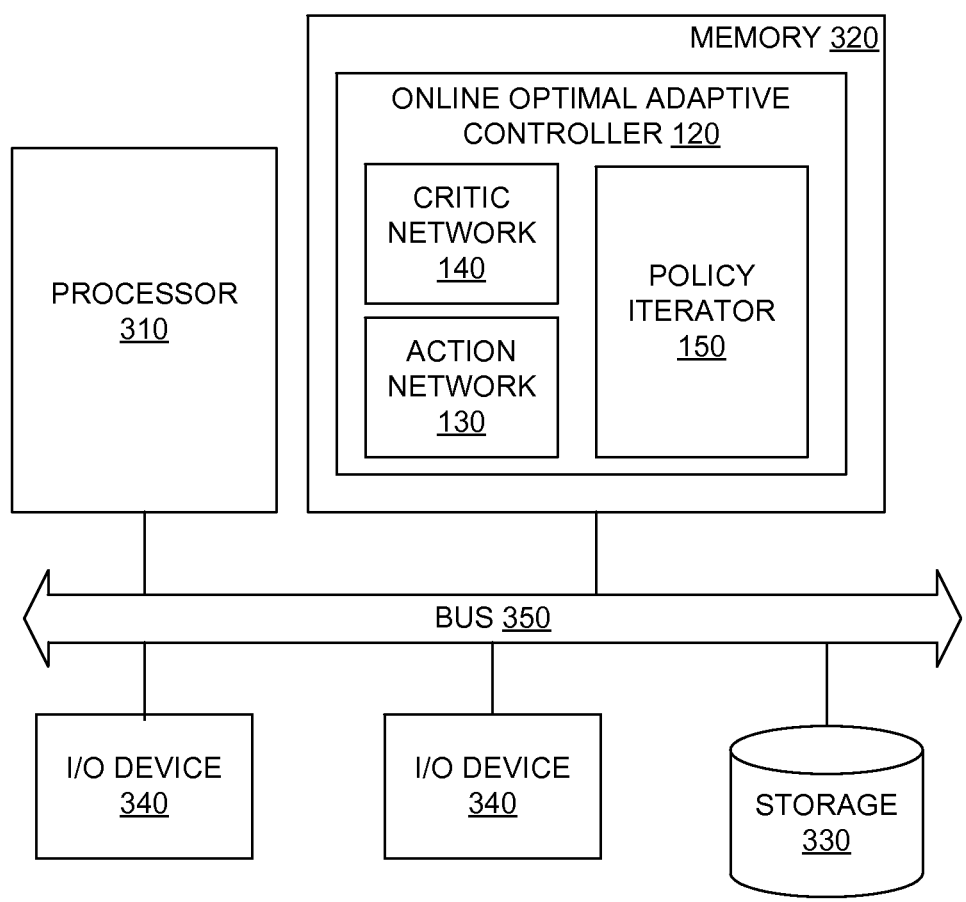
FIG. 3 is a component block diagram of a computing system that implements the optimal online adaptive controller of FIG. 1, according to some embodiments disclosed herein.

FIG. 3 is a block diagram of a computing device that can be used to implement the optimal online adaptive controller 120 according to various embodiments disclosed herein. The computer contains a number of components that are familiar to a person of ordinary skill in the art, including a processor 310, memory 320, non-volatile storage 330 (e.g., hard disk, flash RAM, flash ROM, EEPROM, etc.), and one or more input/output (I/O) devices 340. The components are coupled via one or more buses 350. The I/O devices 340 may be coupled to, or otherwise in communication with, various sensors that measure inputs and outputs of the system under test 110. Omitted from the above figure are a number of conventional components, known to those skilled in the art, which are not necessary to explain the operation of the computer.

The optimal online adaptive controller 120 and other various components described herein may be implemented in software or firmware (i.e., code executed by a processor), may be embodied in dedicated hardware, or a combination thereof. In a software embodiment, instructions are loaded into the memory 320 and from there executed by the processor 310. Thus, the processor 310 is configured by these instructions to implement the optimal online adaptive controller 120. In a dedicated hardware embodiment, the optimal online adaptive controller 120 may be implemented as a circuit or state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or any other hardware device having logic gates for implementing various logic functions upon an application of one or more data signals. Such technologies are generally well known by those skilled in the art and, consequently, are not described in detail herein.

Any logic or application described herein (including the optimal online adaptive controller 120) that comprises software or code can be embodied in any non-transitory computer-readable medium for use by or in connection with an instruction execution system such as, for example, the processor 310. In this sense, the logic may comprise, for example, statements including instructions and declarations that can be fetched from the computer-readable medium and executed by the processor 310. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The diagrams herein show the functionality and operation of an implementation of portions of the optimal online adaptive controller 120. If embodied in software, each block in these diagrams may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 310 in a computer system or other system. The machine code may be converted from the source code, etc. If embodied in hardware, each block may represent a circuit or a number of interconnected circuits to implement the specified logical function(s).

Although any flowchart(s)) described herein show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown in a flowchart may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. It is understood that the diagrams herein merely provide an example of the many different types of functional arrangements that may be employed to implement the operation of portion(s) of the optimal online adaptive controller 120 as described herein. As an alternative, the flowcharts may be viewed as depicting an example of steps of a method implemented by the optimal online adaptive controller 120 according to one or more embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method of adaptively controlling a continuous-time system under control, the continuous-time system under control being described by a system dynamics function f(x), the method comprising:

in a critic network coupled to the continuous-time system under control, determining a cost function that produces a minimum value for a cost of the continuous-time system under control when applied by an action network;

in the action network also coupled to the continuous-time system under control, determining, using the cost function, a control input to apply to the continuous-time system under control that produces the minimum value for the cost of the continuous-time system under control; and tuning respective parameters of the critic network and the action network together and continuously in time by applying respective tuning laws that do not involve the system dynamics function f(x).

2. The method of claim 1, wherein the tuning laws use an integral reinforcement learning (IRL) form of a Bellman equation.

3. The method of claim 1, wherein the only data obtained from the continuous-time system under test that is used during the tuning is measured input/output data from the continuous-time system under test.

4. The method of claim 1, wherein the tuning law for the critic network is given by $$\dot{\hat{W}}_1 = -a_1 \frac{\Delta\phi(x(t))^T}{(1+\Delta\phi(x(t))^T\Delta\phi(x(t)))^2}\left[\int_{t-T}^{t}(Q(x)+u^TRu)d\tau + \Delta\phi(x(t))^T\hat{W}_1\right],$$

where $\dot{\hat{W}}_1$ corresponds to the tuned parameters, $\phi(t)$ is a set of basis functions associated with the continuous-time system under control, $u^TRu$ is the energy used when applying the control input, and $Q(x)$ is an amount of energy for a plurality of system states associated with the continuous-time system under control.

5. The method of claim 1, wherein the tuning law for the critic network is given by $$\dot{\hat{W}}_2 = -a_2(F_2\hat{W}_2 - F_1\Delta\phi(x(t))^T\hat{W}_1) - \frac{1}{4}a_2\overline{D}_1(x)\hat{W}_2\frac{\Delta\phi(x(t))^T}{(1+\Delta\phi(x(t))^T\Delta\phi(x(t)))^2}\hat{W}_1,$$

where $\dot{\hat{W}}_2$ corresponds to the tuned parameters, $\phi(t)$ is a set of basis functions associated with the continuous-time system under control, $u^TRu$ is the energy used when applying the control input, and $Q(x)$ is an amount of energy for a plurality of system states associated with the continuous-time system under control.

6. The method of claim 1, wherein the tuning is performed when the continuous-time system under control is online.

7. The method of claim 1, wherein the cost function is learned by the critic network in real time.

8. The method of claim 1, wherein the continuous-time system under control is further described by a set of system dynamics and the tuning law for the critic network uses only a partially complete model of the system dynamics.

9. The method of claim 1, wherein the cost of the continuous-time system under control corresponds to an amount of control energy used by the continuous-time system under control.

10. The method of claim 1, wherein the cost of the continuous-time system under control corresponds to an amount of fuel used by the continuous-time system under control.

11. The method of claim 1, wherein the continuous-time system under control is further described as a series of system states and the cost of the continuous-time system under control corresponds to an amount of energy used in the system states.

12. A controller for a continuous-time system under control, the continuous-time system under control being described by a system dynamics function f(x), the controller comprising:

an inner-loop feedback controller located in a feed forward path with respect to the continuous-time system under control;

an outer-loop feedback controller in the feed forward path; and a policy iterator, wherein the inner-loop feedback controller comprises the continuous-time system under control and an action network in a feedback loop coupled to the continuous-time system under control, wherein the outer-loop feedback controller comprises a critic network in the feedback loop coupled to the action network, and wherein the policy iterator is operable to tune respective parameters of the critic network and the action network together and continuously in time by applying respective tuning laws that do not involve the system dynamics function f(x).

13. The controller of claim 12, wherein the only data used by the policy iterator from the continuous-time system under test is measured input/output data.

14. The controller of claim 12, wherein the action network is operable to determine a control input to apply to the continuous-time system under control, wherein the action network learns the control input in real time.

15. The controller of claim 12, wherein the critic network is operable to determine a minimum cost function to apply to the action network, wherein the critic network learns the minimum cost function in real time.

16. A non-transitory computer-readable medium embodying a control program executable in at least one computing device to control a continuous-time system under control, the continuous-time system under control being described by a system dynamics function f(x), the control program comprising:

critic network code that determines a cost function that produces a minimum value for a cost of the continuous-time system under control when applied by an action network;

action network code that determines, using the cost function, a control input to apply to the continuous-time system under control that produces the minimum value for the cost of the continuous-time system under control; and policy iterator code that tunes respective parameters of the critic network and the action network together and continuously in time by applying respective tuning laws that do not involve the system dynamics function f(x).

17. The non-transitory computer-readable medium of claim 16, wherein the tuning law for the critic network is given by $$\dot{\hat{W}}_1 = -a_1 \frac{\Delta\phi(x(t))^T}{(1+\Delta\phi(x(t))^T\Delta\phi(x(t)))^2}\left[\int_{t-T}^{t}(Q(x)+u^TRu)d\tau + \Delta\phi(x(t))^T\hat{W}_1\right],$$

where $\dot{\hat{W}}_1$ corresponds to the tuned parameters, $\phi(t)$ is a set of basis functions associated with the continuous-time system under control, $u^TRu$ is the energy used when applying the control input, and Q(x) is an amount of energy for a plurality of system states associated with the continuous-time system under control.

18. The non-transitory computer-readable medium of claim 16, wherein the tuning law for the critic network is given by $$\dot{\hat{W}}_2 = -a_2\left(F_2\hat{W}_2 - F_1\Delta\phi(x(t))^T\hat{W}_1\right) - \frac{1}{4}a_2\overline{D}_1(x)\hat{W}_2\frac{\Delta\phi(x(t))^T}{(1+\Delta\phi(x(t))^T\Delta\phi(x(t)))^2}\hat{W}_1\Bigg],$$

where $\dot{\hat{w}}_2$ corresponds to the tuned parameters, ϕ(t) is a set of basis functions associated with the continuous-time system under control, $u^TRu$ is the energy used when applying the control input, and Q(x) is an amount of energy for a plurality of system states associated with the continuous-time system under control.

19. The non-transitory computer-readable medium of claim 16, wherein the continuous-time system under control is further described by a set of system dynamics and the tuning law for the critic network code uses only a partially complete model of the system dynamics.

20. The non-transitory computer-readable medium of claim 16, wherein the policy iterator code performs the tuning of the critic network and the action network together when the continuous-time system under control is online.

\* \* \* \* \*